United States Patent [19]
Ohara

[11] Patent Number: 5,581,306
[45] Date of Patent: Dec. 3, 1996

[54] VERTICAL SCALING FOR DIGITAL IMAGE DATA WITH APERTURE CORRECTION

[75] Inventor: Kazuhiro Ohara, Plano, Tex.

[73] Assignee: Texas Instruments Incorporated, Dallas, Tex.

[21] Appl. No.: 385,417

[22] Filed: Feb. 8, 1995

[51] Int. Cl.[6] .................................... H04N 5/208
[52] U.S. Cl. .................. 348/625; 348/606; 348/628; 348/630
[58] Field of Search .................... 348/581–582, 348/607, 616–617, 622, 627, 606, 625, 629, 630; H04N 208

[56] References Cited

U.S. PATENT DOCUMENTS

| | | | |
|---|---|---|---|
| 4,336,552 | 6/1982 | Tanaka | 348/606 |
| 4,504,864 | 3/1985 | Anastassiou | 348/619 |
| 5,379,074 | 1/1995 | Hwang | 348/606 |
| 5,424,783 | 6/1995 | Wong | 348/606 |
| 5,430,499 | 7/1995 | Asada et al. | 348/628 |

Primary Examiner—John K. Peng
Assistant Examiner—Glenton B. Burgess
Attorney, Agent, or Firm—Julie L. Reed; James C. Kesterson; Richard L. Donaldson

[57] ABSTRACT

A method of improving the sharpness of horizontal edges of an image that has been vertically scaled. The scaled signal, which represents a series of pixel values, is used to derive an aperture correction value (41–46), which is determined by the scaling ratio and an edge factor. This aperture correction value is added to the scaled signal (47), resulting in enhanced pixel values at edges.

17 Claims, 4 Drawing Sheets

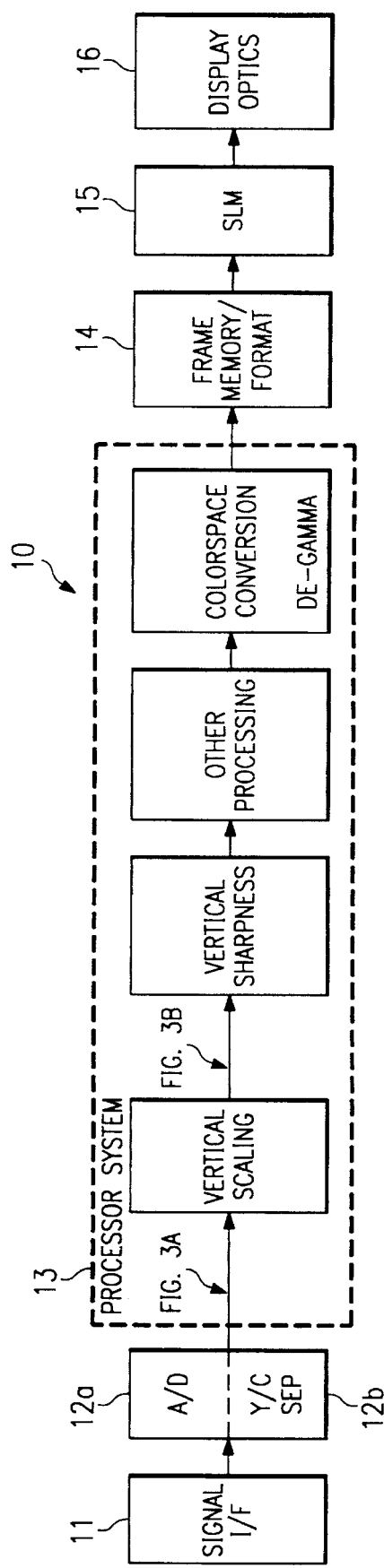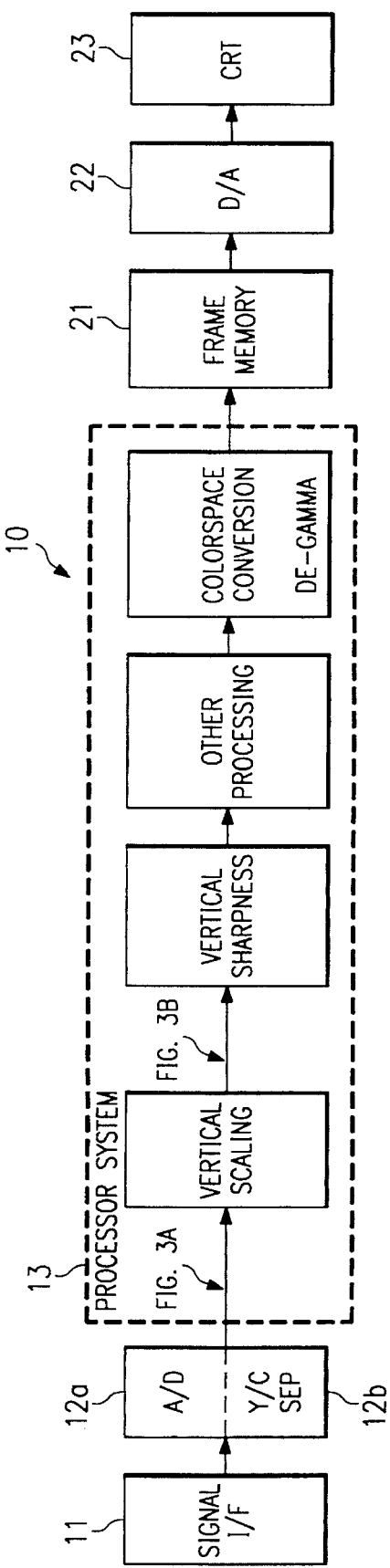

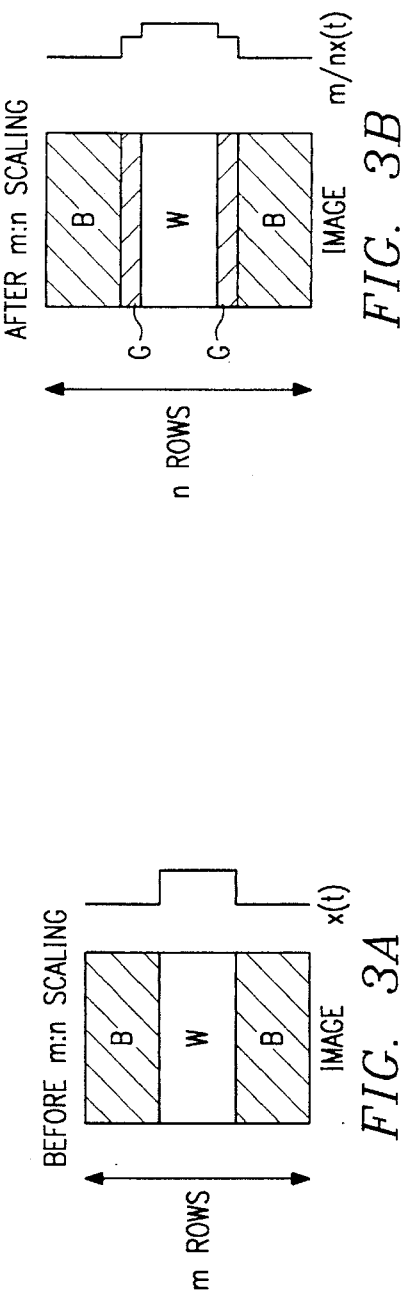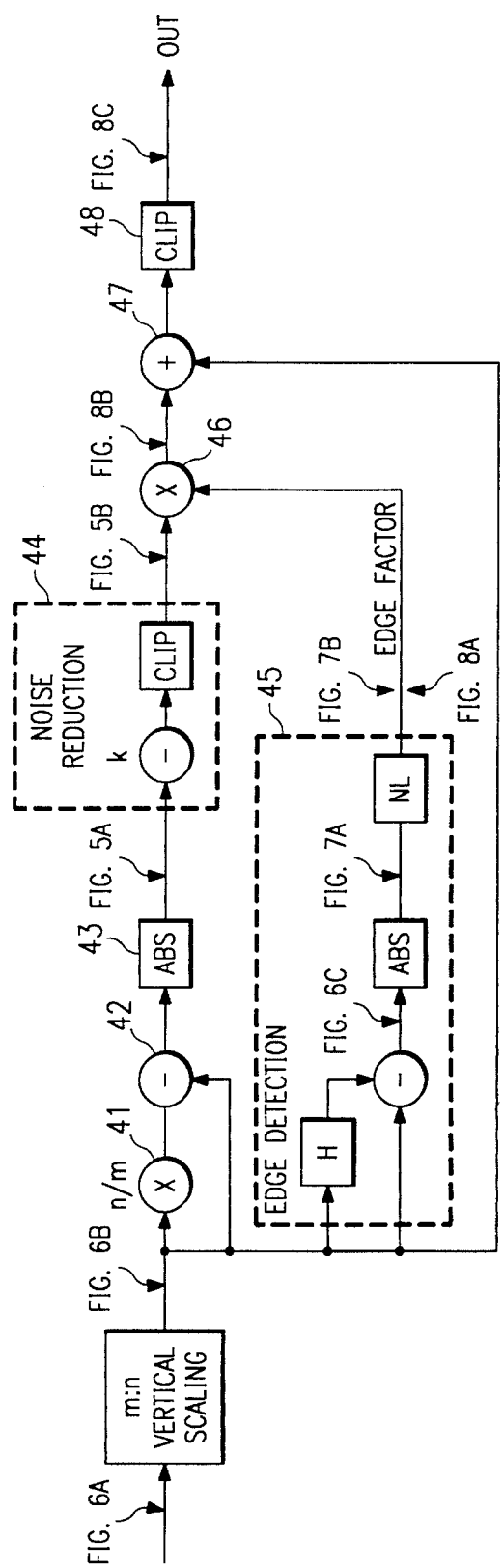

BEFORE SCALING

AFTER SCALING

LINE-DIFFERENCE

ABS AND NL     CLIP

VERTICAL SCALING FOR DIGITAL IMAGE DATA WITH APERTURE CORRECTION

TECHNICAL FIELD OF THE INVENTION

This invention relates to digital image display systems, and more particularly to a method for improving edge sharpness after vertical scaling.

NOTICE OF COPYRIGHT

A portion of this patent document contains material which is subject to copyright protection. The copyright owner has no objection to the facsimile reproduction by any one of the patent disclosure, as it appears in the Patent and Trademark Office patent files or records, but otherwise reserves all rights whatsoever.

BACKGROUND OF THE INVENTION

Today's digital image display systems are designed to perform various video signal processing tasks. These digital image display systems include computer display systems, as well as many of today's television systems.

One video signal processing task is scaling, where the number of pixels per row is increased or decreased (horizontal scaling) or the number of rows is increased or decreased (vertical scaling). Various algorithms have been devised to add or subtract the pixel data required for scaling.

A problem with many vertical scaling algorithms is that the scaled image lacks sharp horizontal edges. For example, where an image has a black-to-white horizontal edge, if a new row of data is generated by interpolation, that new row might result in a grey row between the two rows that previously defined the edge.

SUMMARY OF THE INVENTION

One aspect of the invention is a method of improving the sharpness of an image represented by a digital video signal after the signal has been vertically scaled in accordance with a known scaling ratio. On a pixel-by-pixel basis, the method is performed by multiplying a first pixel value by an inverse scale value. For example, where the scaling ratio is 3:4, the values 1/4 or 1/3 are inverse scale values. The magnitude of the difference is a "scale-difference" for that pixel. Meanwhile, in an edge detection process, the pixel value is compared with the pixel value of the corresponding pixel from an adjacent line, thereby obtaining an "edge factor". The product of the scale-difference value and the edge factor is calculated, thereby obtaining an aperture correction value. This aperture correction value is added to the original scaled pixel value, resulting in the aperture-corrected pixel value. These steps are repeated for each pixel of the image.

An advantage of the invention is that it provides an image with sharper horizontal edges. This edge sharpening may also be referred to as "aperture correction". The method is useful for any type of display system that processes digital image data.

BRIEF DESCRIPTION OF THE DRAWINGS

FIGS. 1 and 2 are block diagrams, each representing the basic components of a digital image display system.

FIGS. 3A and 3B illustrate an image data signal before and after scaling.

FIG. 4 illustrates the aperture correction process of the invention.

DETAILED DESCRIPTION OF THE INVENTION

Figure 5A:
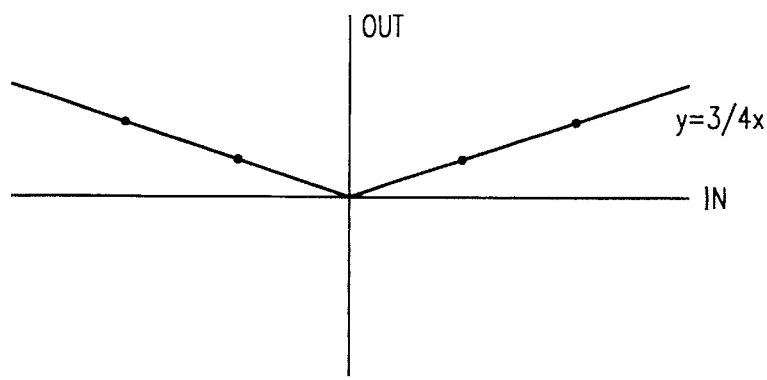
FIGS. 5A and 5B illustrate the input-output relationship of the signal at points 5A and 5B of FIG. 4, and illustrate the noise reduction step of FIG. 4.

FIGS. 1 and 2 are block diagrams, each representing the basic components of a digital image display system 10 and 20, respectively. Both systems either receive digital data or convert analog data to digital data, and perform various processing on the data. System 10 uses a spatial light modulator (SLM) to generate images from the data. System 20 uses a cathode ray tube (CRT), where the data is converted to analog form after being processed. In general, the invention could be used with any display system that digitally processes image data.

The following description is in terms of system 10, and is directed to an aperture correction process performed by processor 13. The process sharpens horizontal edges that might otherwise appear blurry as a result of vertical scaling. The processor 13 of system 20 operates in the same manner as the processor 13 of system 10.

For purposes of example, system 10 is illustrated as receiving an analog video signal, such as a broadcast television signal. It is assumed that the input signal is a "color difference" signal, having a luminance component and a color difference component. Only those components significant to main-screen processing are shown. Other components, such as might be used for processing synchronization and audio signals or for features such as closed captioning, are not shown.

As an overview of the operation of display system 10, signal interface 11 receives the analog video signal and separates video, synchronization, and audio signals. Signal interface 11 delivers the video signal for the main image to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

Processor system 13 prepares the data for display, by performing various pixel data processing tasks. The same processor system 13 could be programmed for all processing tasks. Processor system 13 includes various memory devices for storing pixel data during processing, such as field and line buffers.

In the example of this description, vertical scaling and aperture correction are performed on luminance data, before colorspace conversion. In addition to these tasks, other tasks performed by processor system 13 could include linearization (de-gamma) and line generation. The line generation process converts interlaced fields into display frames. The method of the invention could also be performed on C (chrominance) data as well as on Y data, or could be performed on RGB data.

In the preferred embodiment, processor system 13 includes a "scan-line video processor" for performing scaling and aperture correction. This device is commercially available from Texas Instruments Incorporated, and permits line-by-line processing of pixel data. It may be programmed in accordance with the invention described herein.

Frame memory 14 receives processed pixel data from processor system 15. Frame memory 14 formats the data, on input or on output, into "bit-plane" format, and delivers the bit-planes to SLM 15 one at a time. The bit-plane format permits each pixel element of SLM 15 to be turned on or off in response to the value of 1 bit of data at a time. In a typical display system 10, frame memory 14 is a "double buffer" memory, which means that it has a capacity for at least two display frames. The buffer for one display frame can be read out to SLM 15 while the buffer another display frame is being written. The two buffers are controlled in a "ping-pong" manner so that data is continuously available to SLM 15.

SLM 15 may be any type of SLM. Although this description is in terms of a DMD-type of SLM 15, other types of SLMs could be substituted into display system 10 and used for the invention described herein. For example, SLM 15 could be an LCD-type SLM. Details of a suitable SLM 15 are set out in U.S. Pat. No. 4,956,619, entitled "Spatial Light Modulator", which is assigned to Texas Instruments Incorporated, and incorporated by reference herein. In the example of this description, SLM 17 has a 640×480 array of mirror elements, each of which is individually addressable. When addressed, the direction in which each mirror tilts, on or off, results in a reflected image.

Display optics unit 16 has optical components for receiving the image from SLM 15 and for illuminating an image plane such as a display screen. For color displays, the bit-planes for each color could be sequenced and synchronized to a color wheel that is part of display optics unit 16. Or, the data for different colors could be concurrently displayed on three SLMs and combined by display optics unit 16. Master timing unit 17 provides various system control functions.

A more comprehensive description of a DMD-based digital display system is set out in U.S. Pat. No. 5,079,544, entitled "Standard Independent Digitized Video System", and in U.S. patent Ser. No. 08/147,249, entitled "Digital Television System", and in U.S. patent Ser. No. 08/146,385, entitled "DMD Display System", each assigned to Texas Instruments Incorporated, and each incorporated by reference herein. U.S. patent Ser. No. 07/678,761, entitled "DMD Architecture and Timing for Use in a Pulse-Width Modulated Display System", describes a method of formatting video data for use with a DMD-based display system and a method of modulating bit-planes of data to provide varying pixel brightness. The general use of a DMD-based display system with a color wheel to provide sequential color images is described in U.S. patent Ser. No. 07/809,816, entitled "White Light Enhanced Color Field Sequential Projection". These patent applications are assigned to Texas Instruments Incorporated, and are incorporated herein by reference.

As stated above, for purposes of this invention, one of the processing tasks performed by processor 13 is vertical scaling. Various vertical scaling algorithms have been devised. In general, these algorithms create new rows of pixels using techniques such as line-doubling or interpolation. New pixels in the scaled image are generated by combining pixel values of their neighbors in the original image. Examples of vertical scaling algorithms are described in U.S. patent Ser. No. 08/147,249, incorporated by reference above. U.S. patent Ser. No. 5,489,952, entitled "Method and Device for Multi-Format Television", incorporated by reference, also describes a vertical scaling algorithm, as well as an alternative vertical scaling algorithm that does not interpolate across edges. For example, in the latter patent, an example is given of scaling a standard NTSC signal of 640 pixels per line by 480 lines (a 4:3 aspect ratio) to a high definition signal of 1280 pixels per line of 720 lines (a 16:9 aspect ratio). One method to do this is to double sample the data on each line to achieve 1280 pixels per line, and then vertically scale the data from 480 lines to 720 lines, (a 2:3 scaling ratio, since every 2 lines will create 3 lines in the new image). An example of a 3:4 vertical scaling ration would be to scale from 720 lines to 960 lines.

As stated adove, the following description is in terms of processing the luminance (Y) signal. The algorithm is explained in terms of a signal, $x(t)$, which represents a series of sampled pixel values.

FIGS. 3A and 3B illustrate an image data signal before and after scaling, respectively. For purposes of simple example, the image before scaling is a black image divided by a horizontal white stripe. Intensity values are normalized from 0 (black) to 1 (white).

As shown in FIG. 3A, before m:n scaling, the image has a number, m, of rows, and the signal, $x(t)$, has values from black (intensity=0) to white (intensity=1). The unscaled signal, $x(t)$, indicates sharp horizontal edge transitions of the unscaled image from black to white.

As shown in FIG. 3B, after scaling, the image has a larger number of rows, n. However, the edge transitions now include a grey zone, indicated by the gradual transitions in the signal, $m/n\ x'(t)$, from black to white. The result can be perceptible by a viewer as a blurry edge.

FIG. 4 illustrates in further detail, the vertical scaling process and the subsequent aperture correction process. This process is performed by processor 13, which accesses stored program code comprising appropriate instructions. The process could be performed pixel-by-pixel with an appropriate processor, but as stated above, in the preferred embodiment, the process is performed line-by-line with a processor such as the serial video processor.

For purposes of example, a 3:4 scaling ratio is assumed. At horizontal edges, if the input-output relationship is $y(t)=x(t)$ without scaling, the relationship is $y(t)=3/4 x(t)$ after 3:4 scaling.

As indicated in FIG. 4, the scaled signal, $m/n\ x(t)$, is multiplied by the reciprocal of the scaling ratio. In other words, where the vertical scaling was m:n, the reciprocal of the scaling ratio is n/m. The result of this multiplication is $x(t)$. Then, the scaled signal, $m/n\ x(t)$, is subtracted. The absolute value of this difference results in a scale-difference signal, $1/n\ x(t)$. The coefficient, $1/n$, is equivalent to the inverse of the scaling factor n.

Figure 5B:
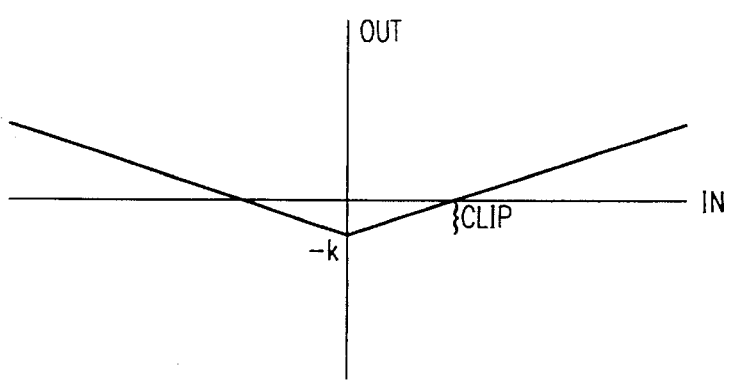

FIG. 5A illustrates the relationship between the input signal, $m/n\ x(t)$, and the scale-difference signal, $1/n\ x(t)$. The scale-difference signal, $1/n\ x(t)$, is assumed to have a noise value, represented by a constant, k. As illustrated by the noise reduction components of FIG. 4 and by FIG. 5B, this noise value is subtracted from the compensated signal. The negative values are then clipped to zero. The result is a noise-reduced scale-difference signal, $1/n\ x(t)'$.

Referring again to FIG. 4, on a parallel path to the path that produces the scale-difference signal, the input signal, $m/n\ x(t)$, is processed with an edge detection algorithm. In the example of FIG. 4, this edge detection is performed by delaying the previous scaled signal one line period, H, to obtain $m/n\ x(t-1)$. The "line period" is the time corresponding to one row of pixel values. The delayed signal, $m/n\ x(t-1)$, is then subtracted from the current signal, $m/n\ x(t)$. In terms of pixel values, each pixel value is subtracted from the pixel value of the pixel immediately below it in the preceding line. The absolute values of the result of the subtractions are line-delayed pixel values.

Figure 6A:
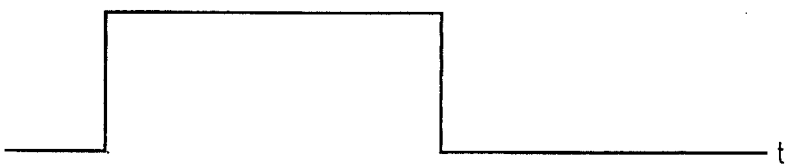
FIGS. 6A–6C illustrate the signal at points 6A, 6B, and 6C of FIG. 4, and illustrate the edge detection step of FIG. 4.
Figure 6B:
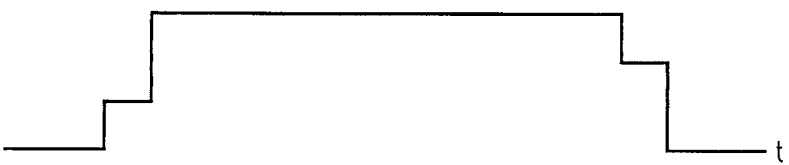
Figure 6C:
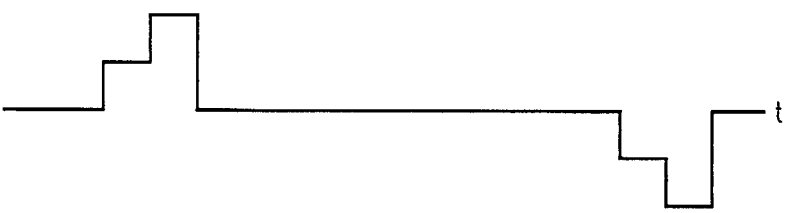

FIGS. 6A–6C illustrate the unscaled signal, the scaled signal, and the line-difference signal, respectively. As compared to FIGS. 5A and 5B, the signals of FIGS. 6A–6C are with respect to time rather than with respect to an input signal. The line-difference signal indicates the degree of transition from one intensity to another, and thus indicates a horizontal edge.

Figure 7A:
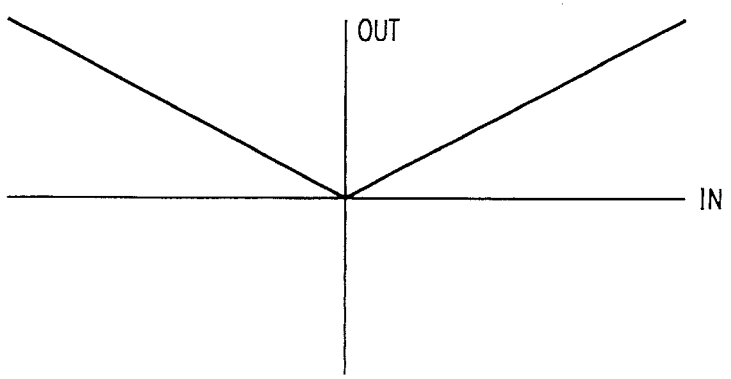
FIGS. 7A and 7B illustrate the input-output relationship of the signal at points 7A and 7B of FIG. 4, and illustrate the non-linear function of the edge detection step of FIG. 4.
Figure 7B:
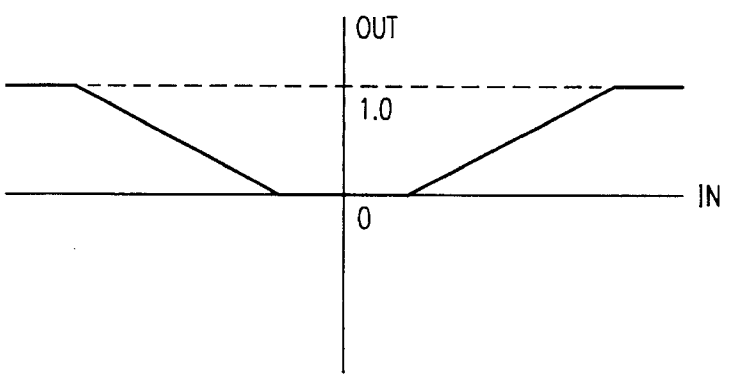

FIG. 7A illustrates the input-output relationship of the input signal, m/n x(t), to the line-difference signal. FIG. 7B illustrates the application of a non-linear (NL) function to this signal. This function converts each line-difference value to a numerical value between 0 and 1.0.

Referring again to FIG. 4, the output of the edge detection algorithm is an edge factor ranging from 0 to 1. This edge factor is multiplied times the noise-reduced scale-difference signal, 1/n x(t)'. The result is an aperture correction signal, which is added to the scaled signal. The result may be clipped if the maximum intensity value has been exceeded resulting in an overflow problem.

Figure 8A:
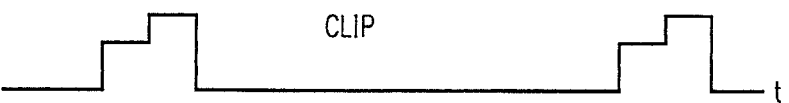
FIGS. 8A–8C illustrate the signal at points 8A, 8B, and 8C of FIG. 4, and illustrate the calculation of the aperture correction signal and its addition to the scaled signal.
Figure 8B:
Figure 8C:
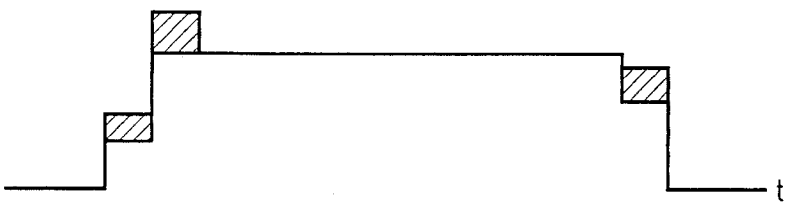

FIGS. 8A–8C illustrate the output of the edge detection algorithm, the aperture correction signal, and the aperture-corrected scaled signal, respectively.

The Appendix is portions of source code for the TMX57102 SVP processor, manufactured by Texas Instruments Incorporated, for implementing the above described method.

Figure 9:
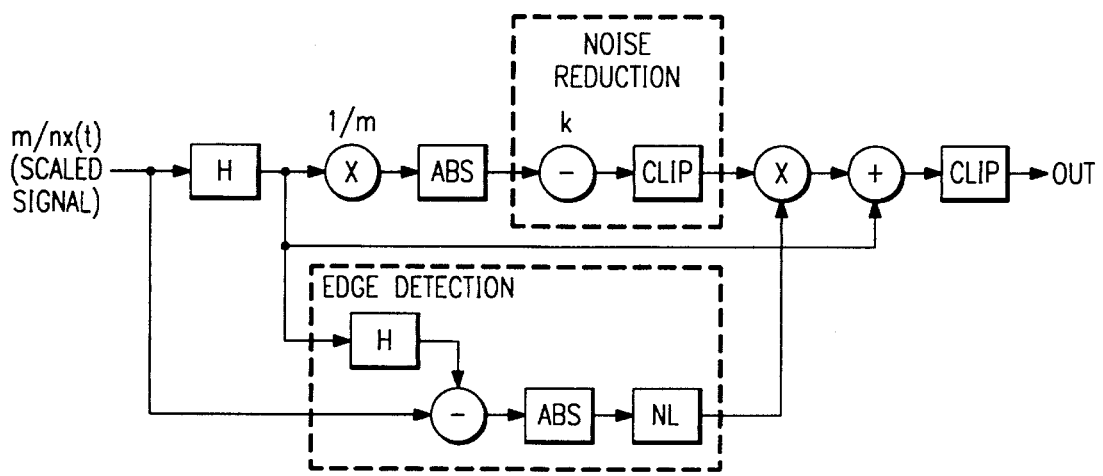
FIG. 9 illustrates an alternative aperture correction process.

FIG. 9 illustrates an alternative edge detection algorithm. As compared to the algorithm of FIG. 4, the signal is first delayed one line period. The delayed signal is multiplied by the inverse of the scaling factor, m, which for a scaling ratio of m:n, is 1/m. The absolute value of the result is a scale-difference value, which may be noise-reduced in a manner similar to the noise reduction of FIG. 4. The edge factor is determined by the absolute value of the difference between the input signal and the two-line delayed signal. A non-linear function is used to obtain an edge factor ranging from 0 to 1.0. The scale-difference value and the edge factor are multiplied to obtain an aperture correction signal, which is added to the input signal.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of improving the sharpness of an image represented by a digital video signal comprised of pixel values, after the signal has been vertically scaled, comprising the steps of:

multiplying a current pixel value by an inverse scaling factor, thereby obtaining a scale-difference value for a current pixel, wherein said scaling factor comprises a ratio of a number of pre-existing lines in said video signal to a desired number of lines in said vertically scaled signal;

comparing said current pixel value with a pixel value of the pixel above or below it in an adjacent line, and using the different to obtain an edge factor;

multiplying said scale-difference value times said edge factor, thereby obtaining an aperture connection value;

adding said aperture correction value to said current pixel value; and repeating the above steps for each pixel of said image.

2. The method of claim 1, further comprising the step of performing a noise-reduction process on said scale-difference value.

3. The method of claim 2, wherein said noise reduction process is performed by subtracting a noise value from said scale-difference value.

4. The method of claim 1, wherein said comparing step is performing by storing the value of a line-delayed pixel value of the pixel immediately below said current pixel.

5. The method of claim 1, wherein said pixel values are luminance values.

6. The method of claim 1, wherein said pixel values are chrominance values.

7. The method of claim 1, wherein said pixel values are red, green, blue values.

8. The method of claim 1, wherein said edge factor ranges from 0 to 1, as determined by applying a non-linear function to the results of said comparing step.

9. The method of claim 1, wherein steps are performed line-by-line of said pixel values.

10. A method of improving the sharpness of an image represented by a digital video signal comprised of pixel values, after the signal has been vertically scaled in accordance with a known scaling ratio, comprising the steps of:

delaying a current pixel value by one line period, thereby obtaining a line-delayed pixel value;

multiplying said line-delayed pixel value by an inverse scaling factor, thereby obtaining a scale-difference value, wherein said scaling factor comprises a ratio of a number of pre-existing lines in said video signal to a desired number of lines in said vertically scaled signal;

delaying the line-delayed pixel value by a second line period, thereby obtaining a two-line-delayed pixel value;

comparing said current pixel value with the two-line delayed pixel value, and using the difference to obtain an edge factor;

multiplying said scale-difference value times said edge factor, thereby obtaining an aperture correction value;

adding said aperture correction value to said line-delayed pixel value; and repeating the above steps for each pixel of said image.

11. The method of claim 10, further comprising the step of performing a noise-reduction process on said scale-difference value.

12. The method of claim 11, wherein said noise reduction step is performed by subtracting a noise value from said scale-difference value.

13. The method of claim 10, wherein said pixel values are luminance values.

14. The method of claim 10, wherein said pixel values are chrominance values.

15. The method of claim 10, wherein said pixel values are red, green, blue values.

16. The method of claim 10, wherein said edge factor ranges from 0 to 1, as determined by applying a non-linear function to the results of said comparing step.

17. The method of claim 10, wherein said steps are performed line-by-line of said pixel values.

* * * * *